(No Model.) 6 Sheets—Sheet 1.

H. E. PAINE.
SOLAR HEATER.

No. 509,390. Patented Nov. 28, 1893.

Attest:
J. W. McAllister
Neill S. Brown

Halbert E. Paine Inventor
By Paine and Ladd
Attys.

(No Model.)  6 Sheets—Sheet 2.

H. E. PAINE.
SOLAR HEATER.

No. 509,390.  Patented Nov. 28, 1893.

Halbert E. Paine Inventor
By Paine and Ladd
Attys.

Attest
J. H. Whistler
Neill S. Brown (No Model.)

H. E. PAINE.
SOLAR HEATER.

Patented Nov. 28, 1893.

Attest:
J. Wm. Mister
Niele S. Brown

Halbert E. Paine
Inventor
By Paine and Ladd
Attys.

(No Model.) H. E. PAINE. 6 Sheets—Sheet 5.
SOLAR HEATER.

No. 509,390. Patented Nov. 28, 1893.

Fig 13.

Attest:
Neill S. Brown

Halbert E. Paine Inventor.
By Paine and Ladd
Attys.

(No Model.) 6 Sheets—Sheet 6.
H. E. PAINE.
SOLAR HEATER.

No. 509,390. Patented Nov. 28, 1893.

Fig. 15.

Attest:
Arthur A. Erb.
S____ N. L__N.

Halbert E. Paine Inventor.
By Paine and Ladd
Attys.

UNITED STATES PATENT OFFICE.

HALBERT E. PAINE, OF WASHINGTON, DISTRICT OF COLUMBIA.

SOLAR HEATER.

SPECIFICATION forming part of Letters Patent No. 509,390, dated November 28, 1893.

Application filed March 15, 1893. Serial No. 466,068. (No model.)

*To all whom it may concern:*

Be it known that I, HALBERT E. PAINE, a citizen of the United States, residing at Washington, in the District of Columbia, have invented certain new and useful Improvements in Solar Heaters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to improved means for utilizing solar heat for industrial purposes; and it consists in the novel combination and arrangement of parts hereinafter fully described and claimed.

Figure 1 is an outside end view of the mirror-frame, showing the heat receiver in front of the same. Fig. 2 is a side view of the mirror-axis, showing two of the studs on which are pivoted two of the devices which support the individual mirrors and serve as means for the vertical adjustments of the individual mirrors and of the group of mirrors. Fig. 4 is a side view of a mirror-supporting-disk, with a mirror holder bolted thereto. Figs. 5, 6, 7, and 8 are detailed views of the several parts of the device by which the vertical inclinations of the individual mirrors and of the group of mirrors are adjusted. Fig. 9 is a top view of the device by which the vertical inclinations of the individual mirrors and of the group of mirrors are adjusted, all its parts being assembled together, and the device, as a whole, being bolted to a section of the hollow axis. Fig. 10 is a top view of the mirror-frame. Fig. 11 is a side view of the mirror-frame, showing mechanism for regulating the vertical adjustment of the group of mirrors.

Figures 1, 4, 5, 6, 8:
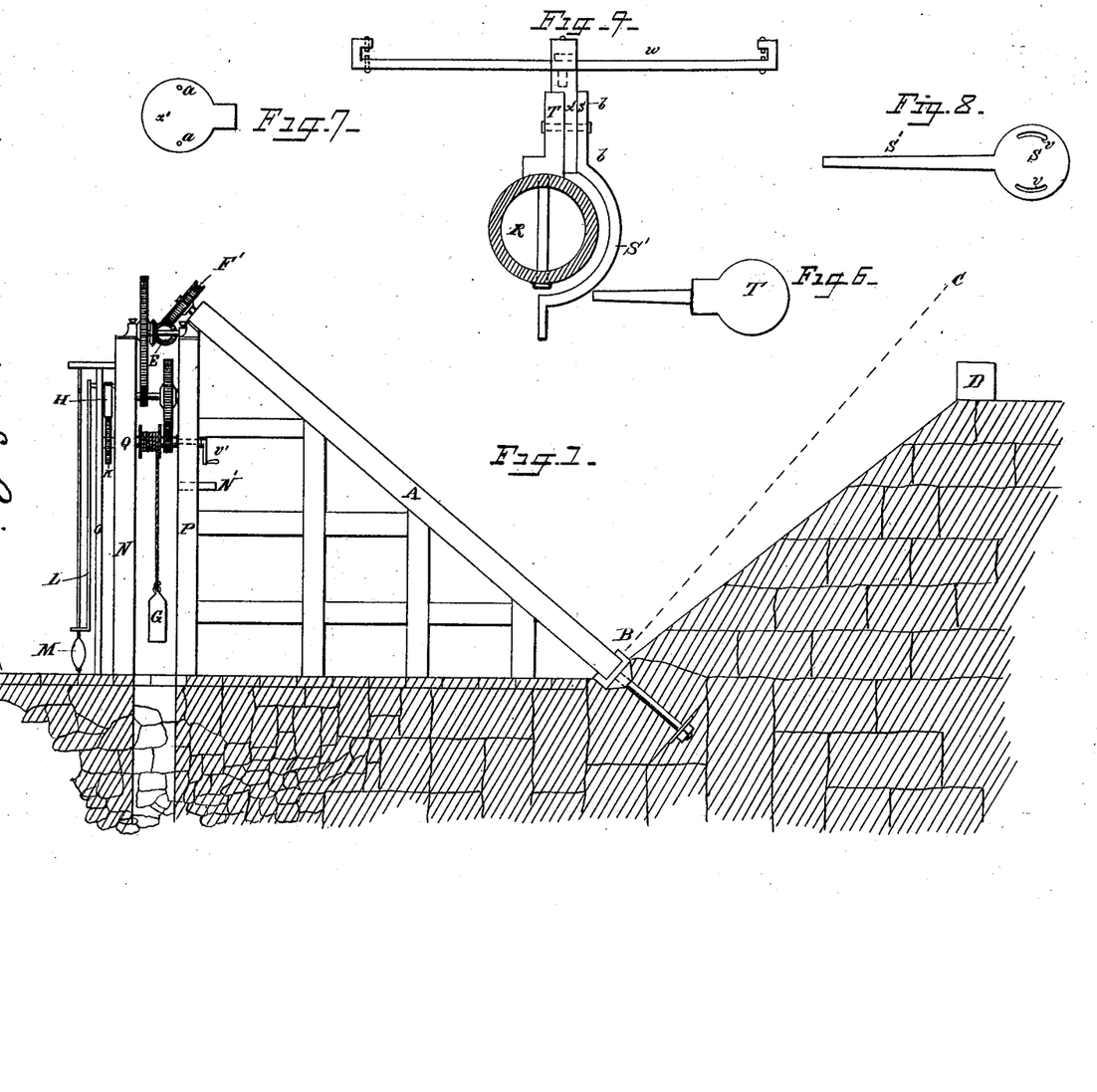

In the drawings: Fig. 1 represents an end view of the mirror-frame. In the northern hemisphere this is the west, in the southern, the east end. The mirror-frame fronts the sun at mid-day. The dotted line B C is a plane parallel to the proximate plane of the sun's apparent diurnal revolution around the earth, and A is the end of the mirror-frame perpendicular to that plane; D is the heat receiver; O, N, P, are supports of the mirror-frame; E is the gear-wheel on the end of the screw-threaded shaft; F' F' are the gear-wheels on the upper ends of the axes; H, K, L, and M, are the escapement, balance-wheel, crutch and pendulum respectively of the clock-work; G is the weight suspended on the drum Q; $v'$ is a crank to wind up the weight-cord; N' is a sliding shelf for the temporary support of the weight. The barrel Q has a pawl and ratchet connection with its shaft.

Figures 2, 4, 5, 10, 11:
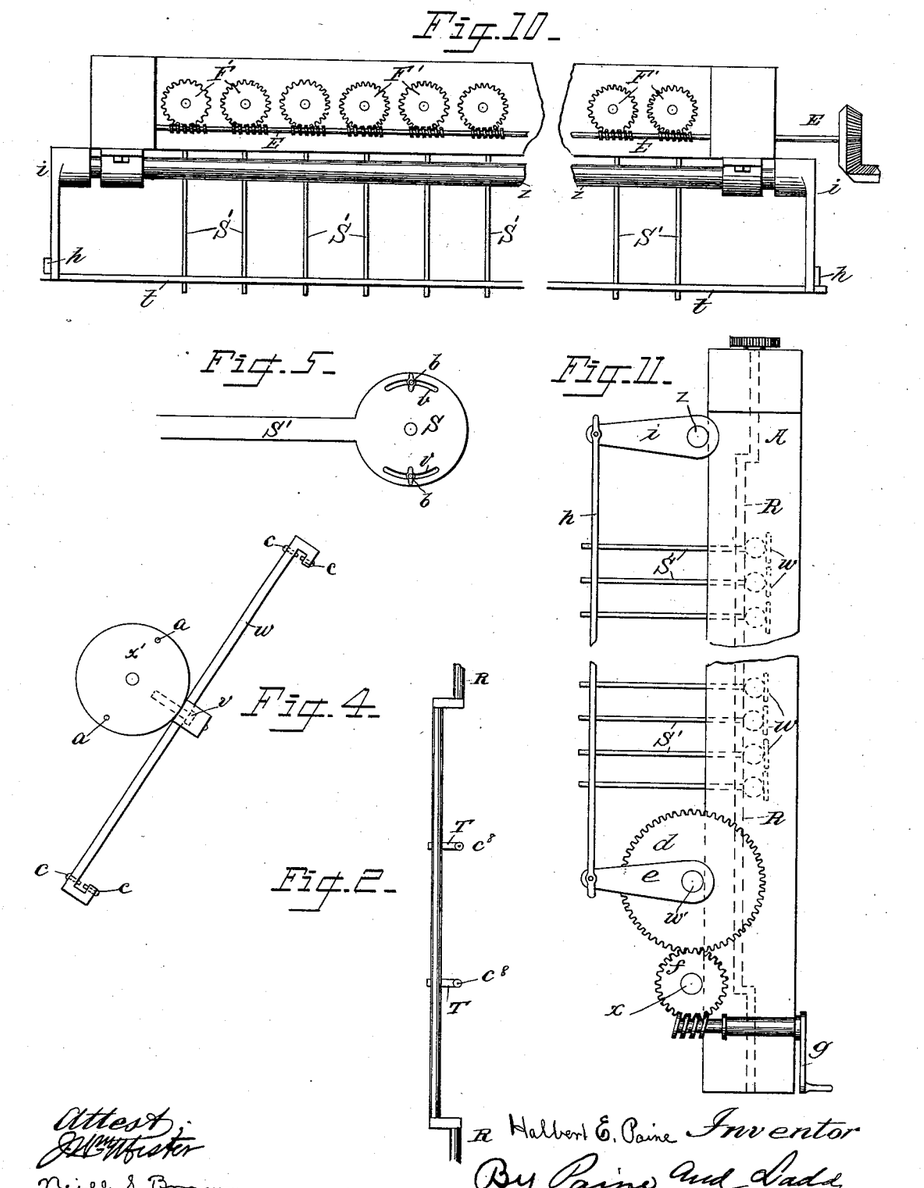

In Fig. 2 R is one of the axes which are perpendicular to the proximate plane of the sun's apparent diurnal movement around the earth. To this axis any suitable number of mirrors may be attached, by means of studs T and pivots, or horizontal axes, $c^8$. Only two studs are shown in this figure. The axial line of R passes through the centers of its two extremities and through the pivots $c^8$.

Figures 3, 14:
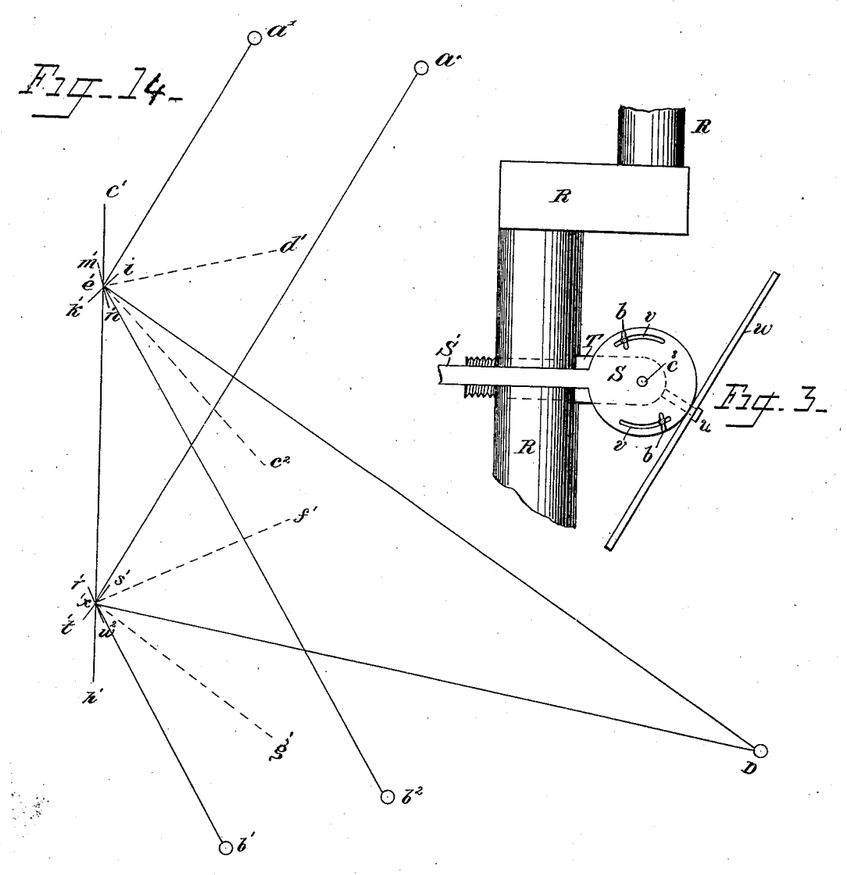
Fig. 3 is a side view of a part of a mirror-axis, showing the device by means of which the vertical adjustments of the mirrors and of the group of mirrors are effected.
Fig. 14 is a diagram, showing the relation of the horizontal angular movement of the sun to that of the mirrors.

In Fig. 3, R is a part of the bent axis rod shown in Fig. 2. T is the stud which supports the individual mirror. Both axes of the mirror pass through $c^8$. The plate to which the mirror $w$ is bolted, is pivoted at $c^8$, but is not shown, being covered by S, to which it is clamped by screws $b, b$, entering through the slots $v, v$. The stud T is to be bolted to R. The nut is omitted in the figure. S' is the arm, by which the vertical inclination of the mirror is changed, as the sun passes to and fro between the tropics.

In Fig. 4, $w, w$, are two arms of the cross which constitutes the holder of the mirror-case. In the extremities of these arms are screws $c, c$, by which slight adjustments are made, to compensate for imperfections of workmanship in the holder or stud. The disk $x'$ is the plate to which the holder is made fast, by the nut $u$. This plate is pivoted on the stud shown in Fig. 3, at $c^8$. Outside of this plate a second plate, S, with an arm, shown on different scales in Figs. 5 and 8, is also pivoted at $c^8$. The two plates are clamped together, by screws which pass through the slots $b$, $b$, and enter the screw holes $a$, $a$, of Figs. 3 and 5.

In Fig. 5, S represents the circular plate which is clamped to the plate $x'$, shown in Figs. 4 and 7, and S' represents the arm which changes the inclination of the mirror, as the sun moves to and fro between the tropics.

In Fig. 6, T is a side view of the stud bolted to the hollow axis R, and bearing the mirror holder $w$ pivoted thereto at $c^8$.

In Fig. 7, $x'$ is a side view of the disk which carries the mirror holder $w$. This disk is pivoted to the stud T at $c^8$. The holes $a$, $a$, receive the set-screws, which pass through the slots $v$, $v$, shown in Fig. 8, and clamp the disk S to the disk T.

In Fig. 8, S is the disk which is clamped to the disk $x'$ (Fig. 7) by screws passing through the slots $v$, $v$. It has an arm S', which elevates and depresses the rods $h$, $h$, shown in Figs. 11 and 12.

In Fig. 9, R is the axis perpendicular to the proximate plane of the sun's apparent diurnal revolution around the earth; T is the stud bolted to this axis; $x'$ is the disk which carries the mirror holder $w$ and is clamped to the disk S, by the set-screws $b$, $b$, both disks being pivoted on the stud T at $c^8$.

In Fig. 10, E is the screw-threaded shaft which actuates the gear-wheels F', F'. These wheels are attached by set-screws to the mirror axes which are perpendicular to the proximate plane of the sun's apparent diurnal revolution around the earth. Through these wheels the clock-work shown in Fig. 1, effects and regulates the daily movement of the mirrors, to correspond with the movement of the sun from sun-rise to sun-set.

In Fig. 11, A is the end of the mirror-frame; $w$, $w$, in dotted lines, are the mirror-holders; S', S', are the arms passing through openings in the cross-pieces, attached to $h$; $g$ is a crank actuating the gear-wheels $f$ and $d$; $e$ is a crank lever rigidly attached to the wheel $d$, which elevates and depresses the rod $h$ and, with it, the cross-pieces which engage the arms S' S'. The gear-wheels $d$, $f$, the crank lever $e$, and the rod $h$, all have counterparts on the opposite end of the mirror-frame. The shafts $w'$, $x$, on which $d$ and $f$ revolve, extend to the opposite end of the mirror-frame, and rotate the counterparts of these two wheels. The shaft $z$, which constitutes the axle of the arm $i$, also extends to the opposite end of the mirror-frame, and there rotates a corresponding arm. The rods $h$, $h$, are connected by pieces $t$, $t$, shown in Fig. 12, bearing plates with slots through which the arms of the mirror pass. The crank lever $e$, rigidly attached to the wheel $d$, elevates and depresses the rods $h$, $h$, and, with them, the cross pieces, $t$, $t$, and so makes changes in the vertical inclination of the mirrors, corresponding with the changes in the altitude of the sun, as it passes to and fro between the tropics.

Figure 12:
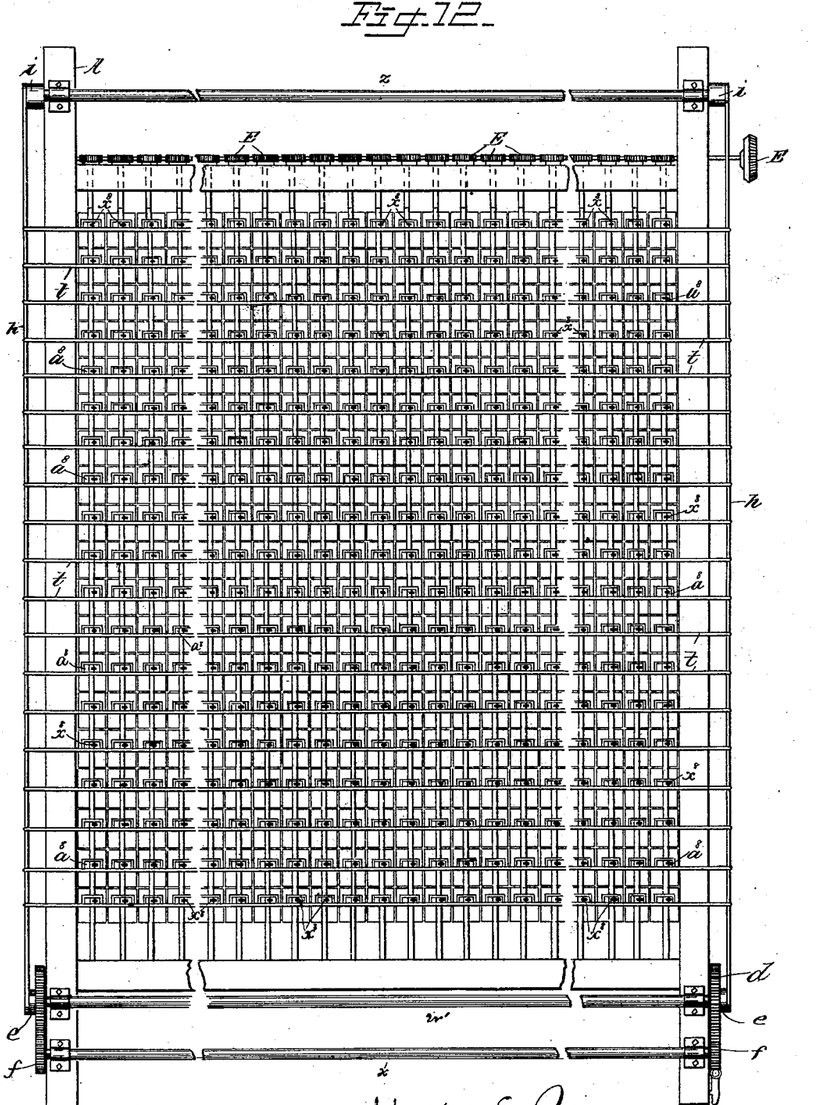
Fig. 12 is a rear view of the mirror-frame.

In Fig. 12, which exhibits the rear of the mirror-frame, $f$, $f$, are the gear-wheels, rotated, on their axis or shaft $x$, by the crank $g$, which actuate the larger gear-wheels $d$, $d$, revolving on their axis $w'$. The crank levers $e$, $e$, are rigidly attached to the wheels $d$, $d$, and are pivoted to the rods $h$, $h$, which rods are pivoted to the cranks $i$, $i$, which revolve on the axis $z$. As the rods $h$, $h$, are elevated or depressed, by the crank levers $e$, $e$, they elevate or depress the cross pieces, $t$, $t$, and thereby elevate or depress the rear ends $x^8$, $x^8$, of the arms of the mirror-holders, which pass through the slots $a^8$, $a^8$, in, or attached to, the cross pieces. The larger gear-wheels $d$, $d$, have ratchet connections with their shaft not shown in the drawings. E is the screw-threaded shaft which actuates the gear-wheels F' F'.

Figure 13:
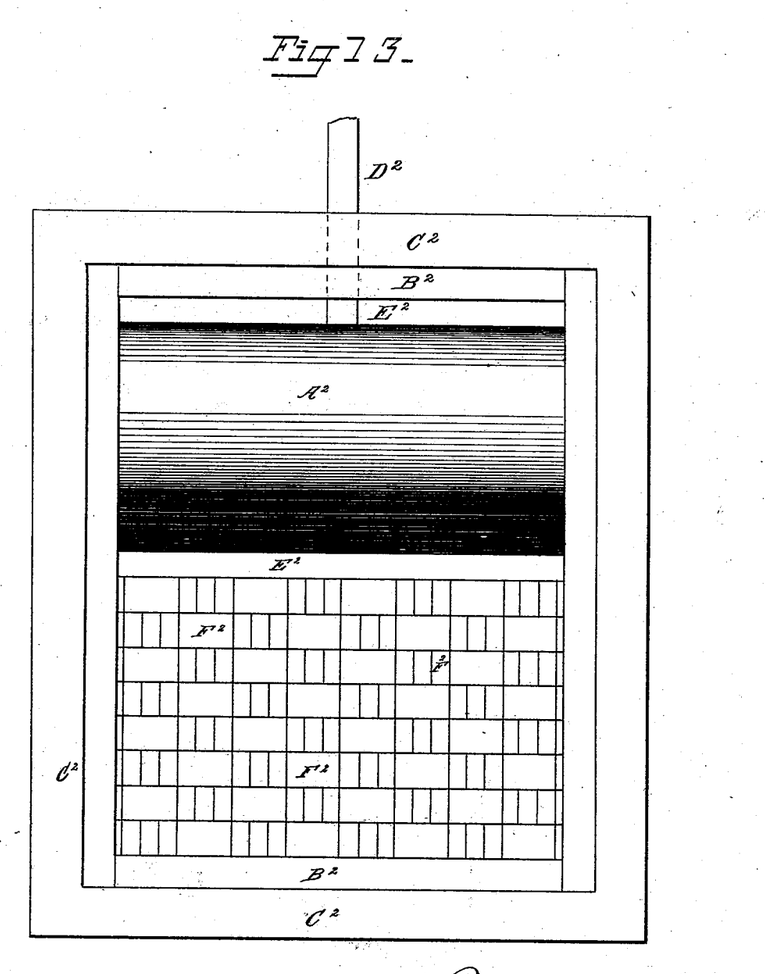
Fig. 13 represents the fire-box.

Fig. 13, represents the fire-box. Its exterior $C^2$ is constructed of suitable material, and lined with a non-conductor of heat $B^2$. $A^2$ is the boiler, or other heat-receiver, to which the heat, when not thrown directly upon the heat-receiver, may be communicated through the mass of refractory material $F^2$. $E^2$ is the space above the refractory material. $D^2$ is the steam-pipe. The front of the fire-box and its lining of non-conducting material are removed in the drawing. It has several openings, at different elevations, closed respectively by non-conducting doors, when not in use.

Fig. 14 illustrates the obvious principle that the horizontal angular movement of the mirrors, during a given period of time, must be half that of the sun, D being the heat receiver, and $a'$, $a^2$, and $b'$, $b^2$ different positions of the sun.

Figure 15:
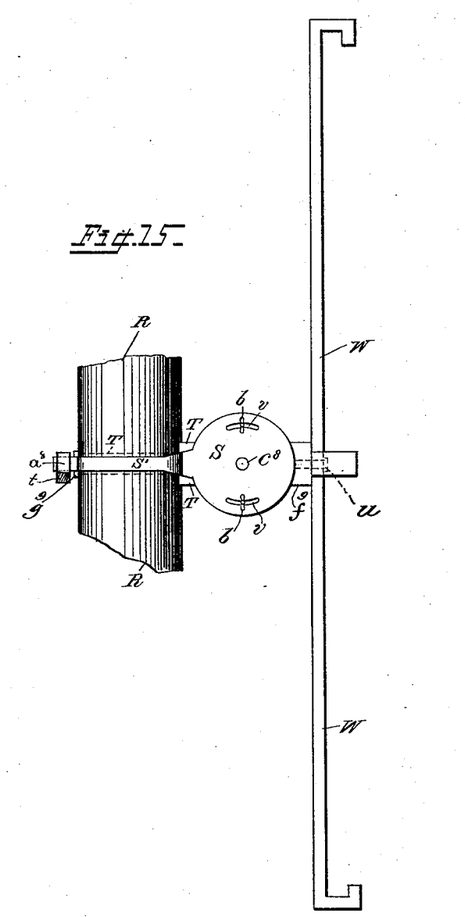
Fig. 15 is a side view of a part of a mirror-axis, showing the means for adjusting the vertical inclinations of the individual mirrors and of the group of mirrors.

In Fig. 15, R is a part of the mirror-axis; W the mirror-frame; $u$ the bolt by which the mirror-frame is attached to a projection $f^9$, on the pivoted disk covered by the disk S; S' the curved arm of S, which passes around the axis R, and through the slot or opening $a^8$. The nuts $b$, $b$, clamp the disk S to the mirror-bearing disk, through the slots $v$, $v$. T is the rear extremity of a third disk, to which the other two are pivoted. This part T passes through the axis R, and is made fast thereto by a nut $g^9$ in the rear. The slot or opening between the cross bars is marked $a^8$.

In the practice of my invention I use an immovable reflector-supporting frame A, having its plane perpendicular to the proximate plane of the sun's apparent diurnal revolution around the earth and bisected, at right angles, by a vertical plane passing through the sun at mid-day. The frame, as a whole, may include several smaller frames, separate from each other, or all connected together, all being in the same plane.

B C Fig. 1, indicate, by dotted lines, a plane parallel to the proximate plane of the sun's apparent diurnal revolution around the earth.

D is the heat-receiver, below the plane B C.

O, N, P, refer to suitable supports for the clock-work, the weight of which, through the barrel Q and the train of gearing, actuates the screw-threaded shaft E, which engages each of the gear-wheels F′, F′, carried at the upper ends of their shafts R, R, and rotates the shafts to meet, or conform to, the apparent diurnal movement of the sun, from sun-rise to sun-set. The barrel Q has a pawl and ratchet connection with its shaft, which is provided with a crank or handle v′ for rewinding the weight-suspending cord, a support N′, secured to the upright P, being used to support the weight temporarily when desired.

The manner of supporting the mirror-frame A and the position of the heat-receiver D will be determined by the character of the surface of the ground upon which is located the smelter, mill, factory or other establishment in which the solar heat is to be utilized. If this location is in the northern hemisphere, and upon the northern slope of a hill or mountain, the reflector-supporting frame may be constructed without excavating or filling the surface. On a southern slope, or a level surface, the frame may be supported upon timbers, masonry, or otherwise; and it may be necessary to place the heat-receiver either above or below the natural surface of the ground. In the drawings the location is a level surface.

In the frame A are suitably supported bent axes R carrying the mirrors w, each mirror being held in a holder by adjusting screws c c, counteracting each other, to compensate for any inaccuracies in the construction of the holder or stud. The axial line of R passes through the extremities thereof and through the pivots $c^8$. The holder w is centrally held by a bolt, u, upon the periphery of a disk or plate x′, itself centrally or axially pivoted, at $c^8$, upon a stud T suitably shouldered, and bolted directly to said axis R. The same pivot $c^8$ carries a second disk or plate S arranged parallel with the disk x′, and adjustably connected thereto, by set-screws or clamp-screws b passing through segmental slots v v. This pivot is the horizontal axis of the mirror. The disk S has, projecting from its periphery, at the rear, an arm S′, by means of which the position of the reflectors is changed, to correspond with the slight daily changes occurring in the position of the sun, as the latter passes to and fro between the tropics. The arms S′ of the series of disks S are passed, at their rear ends, through horizontal slots in the cross-bars t, or in plates secured to the latter, said cross-bars being carried by vertical rods or bars h pivoted to crank-arms e, i, the crank-arm e being rigidly connected with gear-wheels or pinions d and with a shaft z, supported respectively in the frame A. The gear-wheel d, having in practice a pawl and ratchet connection with its shaft, is geared with a smaller wheel or pinion f fixed to a shaft x journaled upon the frame A, and having, rigidly connected therewith, a screw-threaded shaft and crank g, for imparting motion to said wheels or gearing and simultaneously operating or moving, through the aforesaid appliances, all the reflectors in the frame, for the purpose before stated.

Upon the upper ends of the reflector-axes are secured gear-wheels F′ F′, driven by a screw-threaded shaft E geared to the clockwork. Through this mechanism the clockwork effects and regulates the daily movement of the reflectors, to correspond with the movement of the sun from sun-rise to sun-set. To accomplish this, the clock-work is so arranged that, while the sun apparently revolves through an arc of a given number of degrees, minutes, and seconds, each mirror revolves through an arc of half the given number of degrees, minutes, and seconds. Any other suitable device may be substituted for the screw-threaded shaft and gear-wheels.

The adjustment of the vertical inclination of the reflectors, on their horizontal axes, is effected as follows:—The reflectors all being in position, a fixed point is ascertained for the location of the heat-receiver, and a straight rod, passing through this point, is set up parallel to the line of intersection of the plane of the mirror-frame by the vertical plane passing through the sun, at mid-day, and cutting the mirror-frame, at right angles, through the middle. The point fixed for the heat-receiver is marked upon this rod; the screw-threaded shaft is made temporarily immovable; and each of the reflector-axes, which are perpendicular to the proximate plane of the sun's apparent diurnal movement around the earth, is released from the set-screw of its gear-wheel F′, and is then revolved until its mirrors all reflect the images of the sun upon the rod; whereupon its set-screw is tightened. The set-screws b are then loosened and the reflectors are rotated, upon their horizontal axes, until all the mirrors reflect images of the sun upon the point fixed for the heat receiver; and these set-screws are then tightened. If several days are consumed in this adjustment, it is necessary, each day, to elevate or lower the mark, a slight distance, to be determined by observation or trigonometrical calculation, for the latitude of the place, and the distance between the mirror-frame and heat-receiver, in order to compensate for the changes which occur in the sun's apparent altitude, as it passes annually to and fro between the tropics. If this adjustment is accurately made, no further vertical adjustment of the reflectors, without accidental derangement, is necessary, except a slight daily change of their vertical inclination, corresponding with the slow apparent movement of the sun between the tropics.

The adjustment in the plane of the sun's apparent diurnal revolution around the earth is made as follows: The screw-threaded shaft remains immovable. The wheels F′ F′, are thrown out of operation, by loosening their respective set-screws. Within a short time before and after mid-day, the reflector-axes, perpendicular to the proximate plane of the sun's apparent diurnal revolution, are rotated until their mirrors reflect images of the sun upon the heat-receiver D, whereupon the set-screws of the respective wheels F', F', are tightened and the screw-threaded shaft restored to its operative condition. These dispositions, when made for all these axes, conclude the adjustment. A slight variation from the hour of noon, in the adjustment, will not unduly enlarge the field; for, assuming the distance of the heat-receiver from the mirrors to be fifty feet, the lateral movement of the center of the sun's image on the heat-receiver will be, for each minute, only 2.6 inches. This last adjustment is continued from day to day until completed. At the commencement of work in the morning, the clock-work and screw-threaded shaft having been disconnected, the weight G, is raised to its highest position by turning the crank $v'$, actuating the shaft on which the barrel revolves, the weight being there supported upon the shelf N'. The clock-work is then connected with the screw-threaded shaft, the pawl of the barrel is disengaged from the ratchet of its shaft, the set-screw of the balance-wheel K loosened, and by means of the crank $v'$, the wheels F', F', are rotated until the mirrors reflect the images of the sun upon the heat-receiver. At the same time, the bars or rods $h\ h$ are slightly elevated or depressed, by means of the gear-wheels $f$, $d$, changing the vertical angles of the reflectors to correspond with the changed altitude of the sun passing to and fro between the tropics. The pawl and ratchet connection between the barrel and its shaft is then restored, the set-screw of the wheel K tightened, and the shelf N' removed. Thenceforward the mechanism operates automatically until the end of the day's work.

The heat-receiver may be a steam boiler $A^2$, a charge of ore, or anything else to which heat is to be applied, either directly, or through the heated mass of refractory material contained in a fire-box $C^2$, whose lining $B^2$ is of asbestos, or other suitable non-conductor of heat.

$D^2$ is the steam-pipe of the boiler; and $F^2$ is fire-clay, or other suitable refractory material, properly disposed, in the fire-box, to receive the solar heat, through orifices in the front of the fire-box.

$E^2$ is a space surrounding, as far as practicable, the steam boiler, ore charge, or other heat-receiver. When the degree of heat received by the boiler, or other heat-receiver, through the fire-box, is excessive, it may be reduced by placing in the space $E^2$, between the heat-receiver and the heated mass of refractory material, a thick slab of some non-conductor of heat, not shown in the drawings.

The openings or orifices, in the front of the fire-box $C^2$, have different vertical elevations. The highest is used when the heat of the fire-box is low, in order to supply heat to the heat-receiver without delay; the others are used afterward to heat the whole mass of refractory material. The changing of the direction of the concentrated rays, from one of these orifices to another, is effected by elevating or depressing the rods $h$, $h$, by means of the crank or handle $g$. The size and form of the orifices will be determined by the nature of the work to be performed, in the mill or other industrial establishment.

When the number of reflectors is large, it may be necessary, or convenient, to construct the frame in subdivisions, and to use more than one of the devices for elevating or depressing the reflectors, to meet the changes of altitude of the sun in its apparent movement between the tropics, and also to use more than one of the devices for effecting and regulating the movement of the reflectors in a plane parallel to the proximate plane of the sun's apparent diurnal revolution around the earth. The course to be adopted in each case will be obvious to the judgment of those skilled in this art.

It will be understood that I do not restrict my claim to the clock-work, as a means of effecting and regulating the rotary movement of the reflectors upon their axes perpendicular to the proximate plane of the sun's apparent diurnal revolution around the earth.

I claim the utilizing of solar heat by means of a group of plane reflectors attached to rotary axes supported in a stationary frame, said frame being permanently fixed in a plane perpendicular to the proximate plane of the sun's apparent diurnal movement around the earth, and bisected, at right angles, by a vertical plane passing through the sun at midday, said axis being also perpendicular to the proximate plane of the sun's apparent diurnal revolution around the earth, the movement of the reflectors being so regulated that they all constantly reflect the sun's rays upon the same heat-receiver, whether the movement is effected or regulated automatically by clock-work or by other devices, or is effected or regulated by hand. Nor do I restrict my claim to the specific device described for giving to the reflectors, when attached to such axes, and supported in such stationary frames, slight changes in vertical inclination, corresponding with the apparent daily changes, in altitude, made by the sun in its passage to and fro between the tropics.

What I claim is—

1. In mechanism for utilizing solar heat for industrial purposes, the combination of a group of reflectors; a stationary frame or support therefor permanently fixed in a plane perpendicular to the proximate plane of the sun's apparent diurnal motion around the earth, and cut, at right angles, by a vertical plane passing through the sun at midday, with or without additional frames in the same plane; and means to effect the adjustment and regulation of the reflectors so that they shall all constantly reflect images of the sun upon a common heat-receiver, or upon refractory material in a fire-box, substantially as set forth.

2. In mechanism for utilizing solar heat for industrial purposes, the combination of a group of reflectors; a stationary support or frame therefor arranged in a plane perpendicular to the proximate plane of the sun's apparent diurnal motion around the earth, and bisected, at right angles, by a vertical plane passing through the sun at mid-day, with or without additional frames in the same plane; and means to effect and regulate the rotary movement of the reflectors, on their axes, in said stationary frame or support, substantially as and for the purpose specified.

3. In mechanism for utilizing solar heat for industrial purposes, the combination of a group of reflectors; a stationary frame or support therefor; and means to effect a simultaneous rotary movement of all the individual mirrors in vertical planes, such movement corresponding with the apparent change in altitude of the sun as it passes to and fro between the tropics, substantially as specified.

4. In mechanism for utilizing solar heat for industrial purposes, the combination of a stationary mirror frame fixed in a plane perpendicular to the proximate plane of the sun's apparent diurnal motion around the earth; a reflector; an axis for such reflector, perpendicular to the proximate plane of the sun's apparent diurnal revolution around the earth, supported by such stationary frame; and a disk adapted to carry the reflector and being in vertical adjustable connection with a stud held in said axis, substantially as specified.

5. In mechanism for utilizing solar heat for industrial purposes, the combination of a reflector; a stationary frame or support therefor fixed in a plane perpendicular to the proximate plane of the sun's apparent diurnal revolution around the earth; an axis therefor; a disk adapted to carry the reflector; a second disk having a segmental slot and set-screw connection with the aforesaid disk; and a stud held in said axis and having pivoted thereon said disks, substantially as described.

6. In mechanism for utilizing solar heat for industrial purposes, the combination of a reflector; a stationary frame or support therefor, fixed in a plane perpendicular to the proximate plane of the sun's apparent diurnal movement around the earth; an axis therefor supported in said frame and perpendicular to the proximate plane of the sun's apparent diurnal revolution around the earth; a disk adapted to carry said reflector; a second disk having a segmental slot and set-screw connection with the aforesaid disk, and provided with an arm for the adjustment of the vertical inclination of the reflectors; and a stud connected with said axis, and bearing both of said disks, as specified.

7. In mechanism for utilizing solar heat for industrial purposes, the combination of a reflector; a shaft or axis perpendicular to the proximate plane of the sun's apparent diurnal revolution around the earth; a stationary frame or support, fixed in a plane perpendicular to the proximate plane of the sun's apparent diurnal movement around the earth; a stud secured to said shaft or axis, and bearing two disks or plates pivoted to said stud and adjustably connected together, one having a holder for said reflector, and the other having an arm for the adjustment of the reflector in a vertical plane, substantially as described.

8. In mechanism for utilizing solar heat for industrial purposes, the combination of a clock-work movement; a group of reflectors and their support; a series of gear-wheels, geared to said clock-work, and carried upon the reflector-axes which are perpendicular to the proximate plane of the sun's apparent diurnal revolution around the earth; and a screw-threaded shaft engaging said wheels, substantially as specified.

9. In mechanism for utilizing solar heat for industrial purposes, the combination of a reflector-holder; a plate or disk carrying said holder; a second plate or disk connected with the aforesaid disk or plate; a stud bearing both of said disks or plates; and a support for said stud, substantially as specified.

10. In mechanism for utilizing solar heat for industrial purposes, the combination of a group of reflectors; a support therefor; plates or disks connected with means for carrying the mirrors, and having arms projecting to the rear, and a vertically movable or adjustable device for actuating said arms, substantially as specified.

11. In mechanism for utilizing solar heat for industrial purposes, the combination of a group of reflectors; arms connected with the supports for said reflectors; bars or rods carrying cross-pieces to receive the rear ends of said arms; crank-arms connected with said bars and geared to a crank, for actuating said crank-arms and bars, substantially as set forth.

In testimony whereof I affix my signature in presence of two witnesses.

HALBERT E. PAINE.

Witnesses:
LIZZIE CATLETT,
THOS. S. HOPKINS.